3,428,693
PREPARATION OF PENTAERYTHRITOL ALLYL ETHERS IN DIMETHYLSULFOXIDE
Thomas J. Prosser, Wilmington, Del., assignor to Hercules Incorporated, Wilmington, Del., a corporation of Delaware
No Drawing. Filed Jan. 29, 1963, Ser. No. 254,572
U.S. Cl. 260—615　　　　　　　　　　　　　6 Claims
Int. Cl. C07c *41/06, 41/10*

This invention relates to a process for the preparation of allyl ethers of pentaerythritol or dipentaerythritol. More particularly, this invention relates to a process for the preparation of said ethers employing dimethylsulfoxide as the solvent for the reaction.

The preparation of pentaerythritol allyl ethers is known in the art. However, the prior art processes for preparing pentaerythritol allyl ethers have encountered many difficulties. These processes are generally characterized by poor yields of product, relatively long reaction times, undesirable solid impurities present in the final product and the insolubility of the reactants in the reaction medium. Heretofore, because of the above difficulties, a process for the preparation of the tetraallyl ether of pentaerythritol and the tetra-, penta- or hexaallyl ether of dipentaerythritol in good yields has been relatively unknown.

It has now been found that when the reaction of pentaerythritol or dipentaerythritol with allyl halides is carried out in the presence of a strongly basic catalyst and at temperatures between about 50° C. and about 110° C. employing dimethylsulfoxide as the solvent for the reaction, higher substituted allyl ethers can be prepared in excellent yields. By the term higher substituted allyl ethers, as used herein, it is intended to include the tetraallyl ether of pentaerythritol, the tetraallyl ether of dipentaerythritol, the pentaallyl ether of dipentaerythritol and the hexaallyl ether of dipentaerythritol. It is also possible by controlling the ratio of allyl halide to pentaerythritol under the above-stated reaction conditions to obtain the mono-, di- and tri-substituted pentaerythritol or dipentaerythritol allyl ethers.

The essential feature of this invention is the discovery that conducting the above reaction in dimethylsulfoxide in the presence of specific catalysts overcomes the disadvantages stated above and provides for the preparation of higher substituted allyl ethers of pentaerythritol or dipentaerythritol in excellent yields.

Having generally outlined the embodiments of this invention, the following examples constitute specific illustrations. All amounts are based on parts by weight unless otherwise specified.

Example 1

A reaction vessel equipped with reflux condenser, mechanical stirrer, thermometer, gas sparge tube and an inlet for reactants was charged with 272 parts (2.0 moles) of pentaerythritol and 1731 parts (22.2 moles) of dimethylsulfoxide. The vessel and its contents were externally heated to about 80° C.

To the above mixture 546 parts (8.8 moles) of sodium oxide was added. The temperature of the system increased to about 88° C. but subsequently the temperature gradually decreased to about 80° C. The system was flushed with dry nitrogen.

At this point, the heat was turned off and, with good stirring, 674 parts (8.8 moles) of allyl chloride was added slowly, maintaining the temperature under 90° C. Upon completion of the allyl chloride addition, heating was resumed and the reaction mixture was held at a temperature of about 85° C. for about two hours.

The reaction mixture was diluted with an equal volume of water, and the resulting mixture was cooled and then extracted with ether. The product recovered from the ether by distillation weighed 449 parts (76% of theory), of which 94.9% was the tetraallyl ether of pentaerythritol.

This example was rerun using allyl bromide in lieu of allyl chloride. The resulting product was comparable in all respects.

Example 2

The same procedure was followed as in Example 1 except that the mole ratio of allyl chloride and sodium oxide used per mole of pentaerythritol was 4:1.

To 272 parts of pentaerythritol in 1725 parts of dimethylsulfoxide was added 496 parts of sodium oxide. After the addition of 612 parts of allyl chloride and completion of the reaction, the product was extracted and weighed 452 parts (79% of theory), of which 79% was the tetraallyl ether of pentaerythritol.

Two hundred thirty-four parts (1.0 mole) of dipentaerythritol was used in lieu of pentaerythritol following the procedure outlined in this example. A good yield of hexaallyl dipentaerythritol was obtained.

Example 3

The same procedure as in Example 1 was followed with the exception that the vessel was initially heated to 65° C. and the temperature was maintained between 63–67° C. during the reaction period. The final product weighed 491.5 parts (86.2% of theory), and was found to be 76% tetraallyl ether of pentaerythritol.

Example 4

Following the procedure of Example 1, 160 parts of sodium hydroxide was added to 272 parts of pentaerythritol in 1102 parts of dimethylsulfoxide. After the addition of 306 parts of allyl chloride and completion of the reaction, the product was extracted and weighed 380 parts (82.6% of theory), of which 95% was the diallyl ether of pentaerythritol.

Example 5

To a reaction vessel equipped as in Example 1 were charged 272 parts of pentaerythritol and 1731 parts of dimethylsulfoxide. Following the procedure of Example 1, 645 parts (10.4 moles) of sodium oxide was added followed by the addition of 796 parts (10.4 moles) of allyl chloride. After extraction of the final product with ether, subsequent distillation recovered 510 parts (86.2% of theory) of product, of which 93.6% was the tetraallyl ether of pentaerythritol.

Example 6

The same procedure as in Example 1 was followed with the exception that 595 parts (9.6 moles) of sodium oxide and 735 parts (9.6 moles) of allyl chloride was used. The final product weighed 520 parts (88% of theory), of which 87.8% was the tetraallyl ether of pentaerythritol.

Example 7

The identical starting material as in Example 1 was employed with the exception that 352 parts (8.8 moles) of sodium hydroxide was used in lieu of sodium oxide. Since it was desired to obtain the tetraallyl ether of pentaerythritol, it was necessary to control the amount of water present in the reaction medium. This was accomplished in the following manner.

The dimethylsulfoxide, pentaerythritol and sodium hydroxide were charged to the reactor and heated to 100° C. for 0.5 hour. One hundred twenty-five parts of benzene was then added followed by allyl chloride over a 1.0 hour period. The addition temperature was regulated by benzene reflux and was maintained in the 90–100° range with external heating. Evolved water of reaction was removed from a trap as it formed. Following allyl chloride addition, the mixture was maintained at about 100° C. for 1.5 hours. No further water evolution was apparent at the end of this period. The total volume of water collected was 97% of theory and there was obtained a product composed of 97% tetraallyl ether of pentaerythritol (93.6% of theory).

The same procedure was followed using potassium hydroxide in lieu of sodium hydroxide. Comparable results were obtained.

Example 8

A reaction vessel equipped as in Example 1 was charged with 136 parts (1.0 mole) of pentaerythritol and 551 parts (4.4 moles) of dimethylsulfoxide. The vessel and its contents were externally heated to about 80° C.

To the above mixture, 160 parts (4.0 moles) of sodium hydroxide was added. The temperature of the system increased to about 88° C. but subsequently the temperature decreased to 80° C. again. The system was then flushed with dry nitrogen.

Sixty-two and one-half parts of benzene was added and at this point, the heat was turned off and with good stirring, 353 parts (4.0 moles) of methallyl chloride was added slowly, maintaining the temperature under 90° C. Upon completion of the methallyl chloride addition, heating was resumed and the reaction mixture was held for about two hours while maintaining a constant temperature of about 85° C. The water formed was controlled as in Example 7.

The reaction mixture was diluted with an equal volume of water and extracted with ether. The product weighed 299 parts (86% of theory), of which 95% was the tetramethallyl ether of pentaerythritol.

Example 9

A reaction vessel equipped as in Example 1 was charged with 555 parts (2.16 moles) of triallyl pentaerythritol and with 700 parts of dimethylsulfoxide. The vessel and its contents were heated to about 50° C.

170 parts (2.75 moles) of sodium oxide and 229 parts (3.0 moles) of allyl chloride were added following the same procedure as in Example 1. The resulting product weighed 683 parts (87% of theory), of which 94.7% was the tetraallyl ether of pentaerythritol.

In the preparation of ethers by the process of this invention, there are employed as essential starting materials pentaerythritol or dipentaerythritol, dimethylsulfoxide, an allyl halide and a strongly basic catalyst.

Pentaerythritol is a polyhydric alcohol containing four primary hydroxyl groups whereas dipentaerythritol contains six primary hydroxyl groups. In the reaction of these polyhydric alcohols with allyl halides there can be obtained ten distinct ethers, depending on the extent of reaction of the allyl halide with the hydroxyl groups of the alcohol and on the particular alcohol employed as starting material. Thus, if pentaerythritol is used, four distinct ethers may be prepared, whereas if dipentaerythritol is used, six distinct ethers may be prepared. This reaction can be effectively conducted employing stoichiometric amounts of starting reagents, the stoichiometric amount of allyl halide depending, of course, on the particular ether product which it is desired to obtain. However, for optimum results, it has been found that an excess amount of the allyl halide of from about 10 to about 30 mole percent is preferable. This is particularly true in the preparation of the higher substituted allyl ethers.

Examples of allyl halides which are operable herein include allyl chloride, allyl bromide, allyl iodide, methallyl chloride, methallyl bromide and methallyl iodide. The amount of allyl halide to be used in this process depends on which allyl ether of pentaerythritol or dipentaerythritol is to be prepared. Generally, however, from about 1.0 to about 8.0 moles of allyl halide per mole of polyhydric alcohol may be used.

When it is desired to prepare the mono-, di- or tri-allyl ether of pentaerythritol or dipentaerythritol, stoichiometric amounts of allyl halides, i.e., 1, 2 or 3 moles, respectively, of allyl halide per mole of pentaerythritol or dipentaerythritol can be employed to give good results. In connection with the preparation of the monoallyl ether of pentaerythritol or dipentaerythritol, it is preferred to use a low ratio of allyl halide to alcohol. This prevents the reaction from proceeding to the higher substituted allyl ethers, thus resulting in higher yields of the mono-substituted ether. However, when it is desired to prepare the higher substituted allyl ethers, it has been found that an excess of from about 10 to about 30 mole percent of allyl halide is preferable. This normally would require 4–8 moles of allyl halide per mole of polyhydric alcohol.

The strongly basic catalyst used in the process of this invention may be selected from the group consisting of alkali metal hydroxides, alkaline earth metal hydroxides, alkali metal oxides, and alkaline earth metal oxides. More specifically, sodium hydroxide, potassium hydroxide, calcium hydroxide, magnesium hydroxide, sodium oxide, potassium oxide, calcium oxide and magnesium oxide are all suitable catalysts.

The amount of catalyst used in this process depends on the allyl ether desired and, in some cases, on the catalyst employed. In the preparation of the higher substituted ethers by the process of this invention, it is preferred to use from about 10 to about 30 mole percent excess of catalyst. However, if the product desired is the mono-, di-, or triallyl ether of pentaerythritol, or dipentaerythritol, stoichiometric amounts of catalyst may be used. Also, when an alkali metal oxide is used as catalyst and the monoallyl ether of pentaerythritol is the desired product, an amount of catalyst equal to one-half of the amount of pentaerythritol on a mole basis is all that is required. Thus, broadly speaking, 0.5 mole to about 8.0 moles of catalyst per mole of polyhydric alcohol can be used.

In determining the amount of dimethylsulfoxide which is necessary to carry out the reaction, it was found that, as long as there was present a sufficient amount to partially dissolve the polyhydric alcohol, the reaction proceeded smoothly and that excessive amounts of dimethylsulfoxide did not add to the yield or degree of substitution of the final product. It has been found that at least about four moles of dimethylsulfoxide per mole of polyhydric alcohol is necessary to carry out this reaction. It is preferred, however, to use about 4 to about 12 moles of dimethylsulfoxide per mole of polyhydric alcohol.

The reaction between pentaerythritol or dipentaerythritol and the allyl halides may be performed at a temperature of from about 50° C. to about 110° C., preferably between about 65° C. and about 90° C. At temperatures much below 50° C. the reaction does not proceed at a satisfactory rate and, if much higher than 110° C., it appears that competing side reactions occur which seriously decrease the yield.

Another reaction variable which must be considered is the effect of the water formed as a reaction product. When the allyl halide and the polyhydric alcohol react in the presence of the stronger basic catalyst, water is produced along with the ether.

In the preparation of mono-, di- or tri-allyl ethers of pentaerythritol or dipentaerythritol by the process of this invention, the effect caused by the presence of water is of small practical consequences and therefore there is no need for water control. This is so regardless of which catalyst is used. However, in the preparation of the higher substituted allyl ethers by the process of this invention, the presence of water seriously decreases the rate of reaction and renders it virtually impossible to obtain these products in good yields. It is therefore necessary that the amount of water present in the reaction be controlled when preparing these ethers. This can be done by various ways as shown in the examples. To illustrate further, if an alkali metal oxide is employed, water can be controlled by either of two methods. First, at least twice the amount of catalyst required can be used. This leads to the water being further reacted with the excess alkali metal oxide to form alkali metal hydroxide and alkali metal halide, as shown in Example 1. As an alternative method, the water may be removed as formed, either by distillation under reduced pressure or by azeotropic distillation. If an alkali metal hydroxide is used as catalyst in the preparation of the higher substituted allyl ethers, the most practical way of controlling the water is either by distillation under reduced pressure or by azeotropic distillation.

Although this invention is primarily concerned with the preparation of allyl ethers of pentaerythritol and dipentaerythritol and more particularly with the preparation of higher substituted allyl ethers by the reaction of pentaerythritol or dipentaerythritol with allyl halides, it is also possible to prepare the higher substituted allyl ethers by employing as starting material mono-, di- or tri-allyl pentaerythritol or dipentaerythritol, tetra- or penta-allyl dipentaerythritol or combinations of the same. An example of the preparation of the tetraallyl ether of pentaerythritol starting with triallyl pentaerythritol is shown in Example 9.

What I claim and desire to protect by Letters Patent is:

1. A process for the preparation of an ether selected from the group consisting of the tetraallyl ether of pentaerythritol, the tetraallyl ether of dipentaerythritol, the pentaallyl ether of dipentaerythritol and the hexaallyl ether of dipentaerythritol, which comprises contacting, in the presence of an oxide catalyst selected from the group consisting of alkali metal oxides and alkaline earth metal oxides and at a temperature of about 50° C. to about 110° C., an allyl halide with a polyhydric alcohol selected from the group consisting of pentaerythritol and dipentaerythritol, from about four to about eight moles of said allyl halide being employed for every mole of said polyhydric alcohol employed, in the presence of dimethylsulfoxide as the reaction solvent, wherein the amount of said oxide catalyst utilized is at least twice the amount required as catalyst and the excess oxide catalyst removes the water of reaction by reaction therewith.

2. A process according to claim 1 wherein the polyhydric alcohol is pentaerythritol.

3. A process according to claim 1 wherein the polyhydric alcohol is dipentaerythritol.

4. A process according to claim 1 wherein the allyl halide is allyl chloride.

5. A process according to claim 1 wherein the catalyst is sodium oxide.

6. A process for the preparation of the tetraallyl ether of pentaerythritol which comprises contacting one mole of pentaerythritol with from about 4.4 moles to about 5.2 moles of allyl chloride in the presence of from about 4.4 moles to about 5.2 moles of sodium oxide at a temperature of about 80°–90° C. in dimethylsulfoxide as the reaction solvent, the amount of sodium oxide being sufficient to remove the water of reaction by reacting therewith.

References Cited

UNITED STATES PATENTS

| | | | |
|---|---|---|---|
| 2,483,739 | 10/1949 | Roach et al. | 260—615 |
| 3,032,594 | 5/1962 | Towle | 260—612 |

OTHER REFERENCES

Raichle et al., German application 1,065,401 printed Sept. 17, 1959 (Kl. 120—5/09), 2 pages spec.

Groggins, Unit Processes in Organic Synthesis, 4th ed. (1952), page 803, QD262 G7.

LEON ZITVER, *Primary Examiner.*

H. T. MARS, *Assistant Examiner.*